United States Patent
Van Matre

(10) Patent No.: US 12,461,725 B2
(45) Date of Patent: Nov. 4, 2025

(54) SYSTEMS AND METHODS FOR DISTRIBUTED DECISION-MAKING AND SCHEDULING

(71) Applicant: Brian Van Matre, Lafayette, CO (US)

(72) Inventor: Brian Van Matre, Lafayette, CO (US)

(73) Assignee: Roster-5 Software, Inc, Louisville, CO (US)

( * ) Notice: Subject to any disclaimer, the term of this patent is extended or adjusted under 35 U.S.C. 154(b) by 0 days.

(21) Appl. No.: 18/738,538

(22) Filed: Jun. 10, 2024

(65) Prior Publication Data

US 2024/0354083 A1    Oct. 24, 2024

Related U.S. Application Data

(63) Continuation of application No. 17/823,781, filed on Aug. 31, 2022, now Pat. No. 12,169,704.

(60) Provisional application No. 63/239,876, filed on Sep. 1, 2021.

(51) Int. Cl.
*G06F 8/41*    (2018.01)
*G06F 9/32*    (2018.01)

(52) U.S. Cl.
CPC .............. *G06F 8/452* (2013.01); *G06F 9/325* (2013.01)

(58) Field of Classification Search
None
See application file for complete search history.

(56) References Cited

U.S. PATENT DOCUMENTS

| | | | | |
|---|---|---|---|---|
| 8,984,515 B2* | 3/2015 | Gupta | .................. | G06F 9/5066 707/720 |
| 9,152,601 B2* | 10/2015 | Kaminski | ............. | G06F 9/5066 |
| 10,715,407 B2* | 7/2020 | Hu | ....................... | H04L 43/0817 |
| 2007/0044077 A1* | 2/2007 | Srivastava | .......... | G06F 9/44589 717/126 |
| 2008/0016157 A1* | 1/2008 | Sahraie | ............... | H04L 65/1104 709/205 |
| 2008/0215409 A1* | 9/2008 | Van Matre | ......... | G06Q 10/0631 705/7.12 |
| 2012/0150335 A1* | 6/2012 | Prabhu | ............... | G05B 23/0294 700/110 |
| 2012/0166254 A1* | 6/2012 | Chang | .............. | G06Q 10/06315 705/7.36 |
| 2013/0297972 A1* | 11/2013 | Yokote | ................ | G06F 11/3051 714/15 |

(Continued)

*Primary Examiner* — Philip Wang
(74) *Attorney, Agent, or Firm* — Martensen IP; Chad G. Clark

(57) ABSTRACT

An embodiment of the disclosed invention is a computer-implemented method to build a schedule, which includes establishing a scheduling period and a number of tasks to be accomplished during the schedule, assigning an expected value to each of the tasks, and using an iterative RIDES loop to adjust the expected value for each task and rebuild the schedule until the expected value is optimized. Another embodiment is a computer-implemented method to optimize a schedule that includes using an iterative RIDES loop to determine whether to execute a first schedule allocation or continue to improve the schedule allocation. Another embodiment is a method for implementing a loop architecture to update an expected value for a task using data from the environment, wherein the expected task value is the maximum task value multiplied by a weighting factor.

22 Claims, 10 Drawing Sheets

(56) References Cited

U.S. PATENT DOCUMENTS

| | | | |
|---|---|---|---|
| 2014/0333638 A1* | 11/2014 | Kaminski | G06F 15/17 345/522 |
| 2016/0077870 A1* | 3/2016 | Pho | G06F 9/4881 718/103 |
| 2021/0034412 A1* | 2/2021 | Televitckiy | G05D 1/0088 |
| 2023/0097044 A1* | 3/2023 | Mwanje | H04L 41/147 370/241 |

* cited by examiner

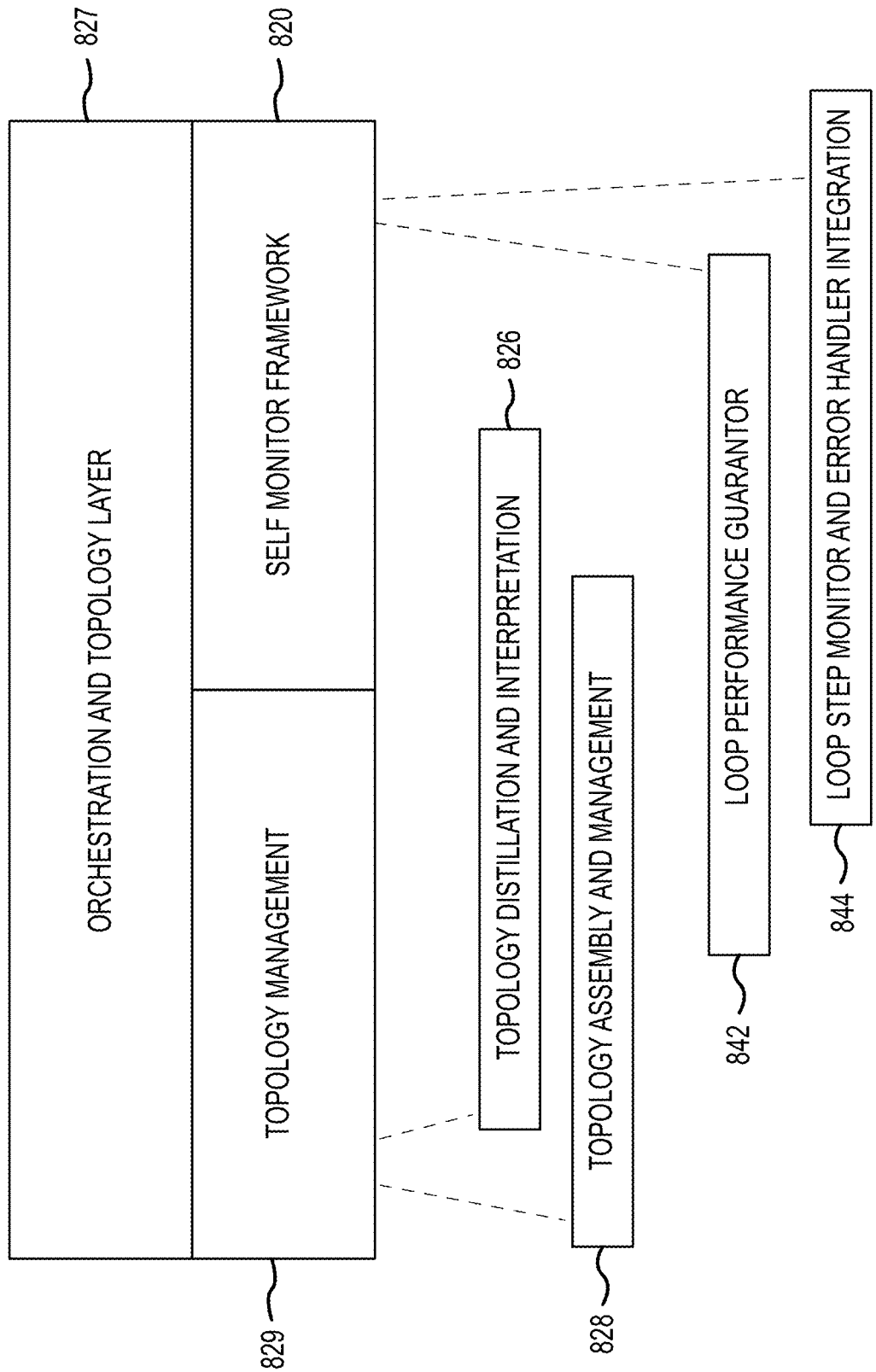

SYSTEMS AND METHODS FOR DISTRIBUTED DECISION-MAKING AND SCHEDULING

CROSS-REFERENCE TO RELATED APPLICATIONS

This application claims priority to U.S. Provisional Application No. 63/239,876, filed Sep. 1, 2021, and is a continuation of U.S. patent application Ser. No. 17/832,781, filed Aug. 31, 2022, which are hereby incorporated by reference herein in their entirety.

BACKGROUND

Field of the Invention

The disclosed invention relates to systems and methods for improving distributed, adaptive, and scalable decision-making, to include automated scheduling.

Relevant Background

Existing systems for performing automated decision-making functions, including scheduling of tasks, suffer serious shortcomings and deficiencies. Namely, many systems rely on centralized control and decision-making, which limits the resilience, complexity, extensibility, and timeliness of their execution. Further, automated decision-making algorithms are often custom designed, requiring years of development and expensive specialized hardware. Such custom-designed algorithms typically have limited compatibility with other contemporaneous decision-making functions. Additionally, current automated decision-making systems lack the ability to properly and dynamically value the multiple factors that may contribute to a task. Because of these deficiencies, existing automated decision-making systems are challenging to implement, can handle only a subset of the potential problems amenable to automated processes, and are unable to interface effectively with other functions.

For example, existing scheduling systems for complex operations suffer from centralized control, expensive implementation, and incompatibility with other scheduling systems. Most existing scheduling systems are suitable for only a specific application, such as scheduling restaurant workers, performing workflow management, coordinating service businesses, etc. They also may take months to be adapted to a specific enterprise, may not cover all of an enterprise's use cases.

Therefore, it is apparent that a need exists for scalable and adaptive distributed decision-making processes that perform iterations of a set of sequential steps, while continually self-monitoring performance and having compatible interfaces with other automated functions.

These and other deficiencies of the prior art are addressed by one or more embodiments of the disclosed invention. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out hereafter.

BRIEF DESCRIPTION OF THE DRAWINGS

Features and objects of the present invention and the manner of attaining them will become more apparent, and the invention itself will be best understood, by reference to the following description of one or more embodiments taken in conjunction with the accompanying drawings and figures.

FIG. 8 depicts a portion of a block diagram representing embodiments of the disclosed automated decision-making system.

Figure 1:
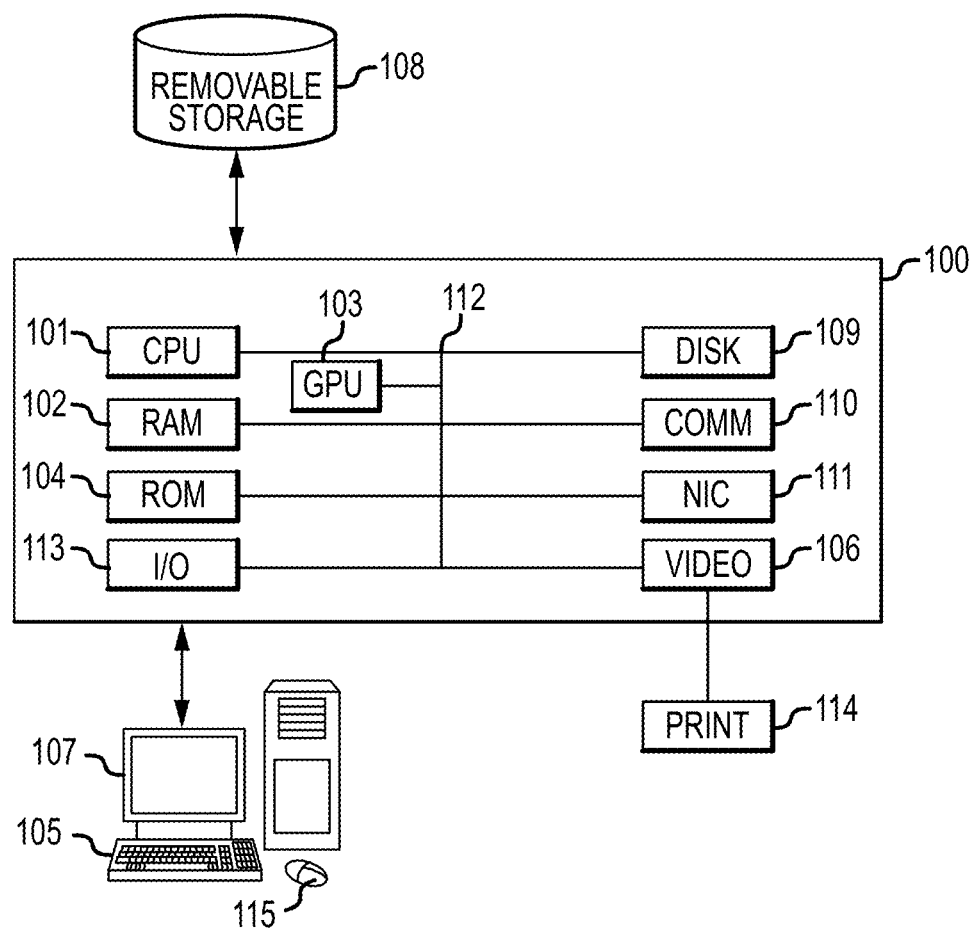
FIG. 1 depicts a view of a general-purpose computer for executing elements of the disclosed invention.

The Figures depict embodiments of the disclosed invention for purposes of illustration only. One skilled in the art will readily recognize from the following discussion that alternative embodiments of the structures and methods illustrated herein may be employed without departing from the principles of the invention described herein.

Definitions

"MapReduce" means a prior computing framework for processing large volumes of data wherein the data processing problem is fit to a standardized set of steps that includes mapping the data into categories, then reducing or processing the data to produce standardized outputs. The use of standardized inputs and outputs allows MapReduce applications to distribute data processing across several computing cores with minimal custom software implementation.

"Framework" means a computing paradigm for performing a task or solving a problem wherein the input, operational structure, and output are constrained by a set of rules.

"OODA Loop" means a theoretical decision-making process comprised of at least one sequence of Observe, Orient, Decide, and Act, wherein the decision maker observes the environment, uses the acquired information to orient within the environment, makes a decision about taking an action based on the orientation, and then executes the decision. The decision maker may then run subsequent iterations of the process in order to continually adapt to a dynamic environment.

"Algorithm" means a self-consistent sequence of operations or similar processing leading to a desired result.

"Artificial Intelligence" (AI) or machine learning (ML) means a branch of computer science concerned with building smart machines capable of performing tasks that typically require human intelligence. AI is an interdisciplinary science with multiple approaches that allow machines to learn from experience, adjust to new inputs and perform human-like tasks. Using these technologies, computers can be trained to accomplish specific tasks by processing large amounts of data and recognizing patterns in the data.

"Enterprise" means a task requiring the execution of two or more related decision-making tasks.

"Expected value" means the benefit to an enterprise expected to be gained by the performance of a task, or the expected benefit of performing the tasks comprising the enterprise as a whole.

DESCRIPTION

The disclosed invention relates to systems and methods providing a scalable and adaptive framework for performing automated decision-making, to include scheduling.

The disclosed invention will now be described in detail with reference to several embodiments thereof as illustrated in the accompanying Figures. In the following description, numerous specific details are set forth in order to provide a thorough understanding of embodiments of the invention. It will be apparent, however, to one skilled in the art that embodiments may be practiced without some or all of these specific details. In other instances, well known process steps and/or structures have not been described in detail in order to not unnecessarily obscure the disclosed invention. The features and advantages of embodiments may be better understood with reference to the drawings and discussions that follow.

It should be apparent to those skilled in the art that the described embodiments of the disclosed invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the disclosed invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the disclosed invention as the embodiments disclosed herein are merely exemplary.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under," or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal," and the like are used herein for the purpose of explanation only unless specifically indicated otherwise.

Included in the description are flowcharts and block diagrams depicting examples of the methodology and components which may be used to provide automated decision-making. In the following description, it will be understood that each block of such illustrations, and combinations of blocks in such illustrations, can be implemented by computer program instructions. These computer program instructions may be loaded onto a computer or other programmable apparatus to produce a machine such that the instructions that execute on the computer or other programmable apparatus create means for implementing the functions specified in the illustration block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the illustration block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the illustration block or blocks.

Accordingly, blocks of the flowchart and block diagram illustrations support combinations of means for performing the specified functions and/or combinations of steps for performing the specified functions. It will also be understood that each block of the illustrations, and combinations of blocks in the illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

One having skill in the art will recognize that portions of the disclosed invention may be implemented on a specialized computer system, or a general-purpose computer system, such as a personal computer (PC), a server, a laptop computer, a notebook computer, or a handheld or pocket computer. FIG. 1 is a general block diagram of a general-purpose computer system in which software-implemented processes of the present invention may be embodied. As shown, the system 100 comprises one or more central processing unit(s) (CPU) or processor(s) 101 coupled to a random-access memory (RAM) 102, a graphics processing unit(s) (GPU) 103, a read-only memory (ROM) 104, a keyboard or user interface 105, a display or video adapter 106 connected to a display device 107 (e.g., screen, touchscreen, or monitor), a removable storage device 108 (e.g., flash drive, floppy disk, CD-ROM, CD-R, CD-RW, DVD, etc.), a fixed storage device 109 (e.g., hard disk), a communication (COMM) port(s) or interface(s) 110, and a network interface card (NIC) or controller 111 (e.g., Ethernet). Although not shown separately, a real time system clock is included with the system 100, in a conventional manner.

The CPU 101 comprises a suitable processor for implementing the present invention. The CPU 101 communicates with other components of the system via a bi-directional system bus 112, and any necessary input/output (I/O) controller 113 circuitry and other "glue" logic. The bus, which includes address lines for addressing system memory, provides data transfer between and among the various components. RAM 102 serves as the working memory for the CPU 101. ROM 104 contains the basic I/O system code (BIOS), which is a set of low-level routines in ROM that application programs and the operating systems can use to interact with the hardware, including reading characters from the keyboard, outputting characters to printers 114, etc.

Mass storage devices 108, 109 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 1, fixed storage 109 stores a body of program and data for directing operation of the computer system, including an operating system, user application programs, driver, and other support files, as well as other data files of all sorts. Typically, the fixed storage 109 serves as the main data storage for the system.

In operation, program logic (including that which implements methodology of the disclosed invention described herein) is loaded from the removable storage 108 or fixed storage 109 into the main (RAM) memory 102, for execution by the CPU 101. During operation of the program logic, the system 100 accepts user input from a keyboard and pointing device 115, as well as speech-based input from a voice recognition system (not shown). The user interface 105 permits selection of application programs, entry of keyboard-based input or data, and selection and manipulation of individual data objects displayed on the screen or display device 107. Likewise, the pointing device 115, such as a mouse, track pad, track ball, pen device, or a digit in the case of a touch screen, permits selection and manipulation of objects on the display device. In this manner, these input devices support manual user input for any process running on the system.

The computer system 100 displays text and/or graphic images and other data on the display device 107. The video adapter 106, which is interposed between the display 107 and the system bus, drives the display device 107. The video adapter 106, which includes video memory accessible to the CPU 101, provides circuitry that converts pixel data stored in the video memory to a raster signal suitable for use by a display monitor. A hard copy of the displayed information, or other information within the system 100, may be obtained from the printer 114, or other output device.

The system itself communicates with other devices (e.g., other computers, other networks) via the NIC 111 connected to a network (e.g., Ethernet network, wifi, Bluetooth wireless network, etc.). The system 100 may also communicate with local occasionally connected devices (e.g., serial cable-linked devices) via the COMM interface 110, which may include a RS-232 serial port, a Universal Serial Bus (USB) interface, or the like. Devices that will be commonly connected locally to the interface 110 include desktop computers, laptop computers, handheld computers, etc.

The system may be implemented through various wireless networks and their associated communication devices. Such networks may include mainframe computers, or servers, such as a gateway computer or application server which may have access to a database. A gateway computer serves as a point of entry into each network and may be coupled to another network by means of a communications link. The gateway may also be directly or indirectly coupled to one or more devices using a communications link, or may be coupled to a storage device such as a data repository or database.

Map Reduce Framework

The disclosed invention is a framework that can be analogized to the revolutionary MapReduce framework used to facilitate the solution of certain types of "Big Data" problems. MapReduce frameworks, first used extensively by Google, Inc., and translated to open-source software as Hadoop, have allowed developers to more easily solve problems, such as the processing of large files of undifferentiated internet data, that previously required intensive software implementation and specialized computing resources. Programmers starting from a MapReduce environment can quickly write software to process terabytes of data efficiently. While individual steps in the MapReduce framework can be complex, the programmer does not have to worry about hardware error handling, managing the communication among processes running in parallel, or distributing the data across systems to be processed.

Figure 2:
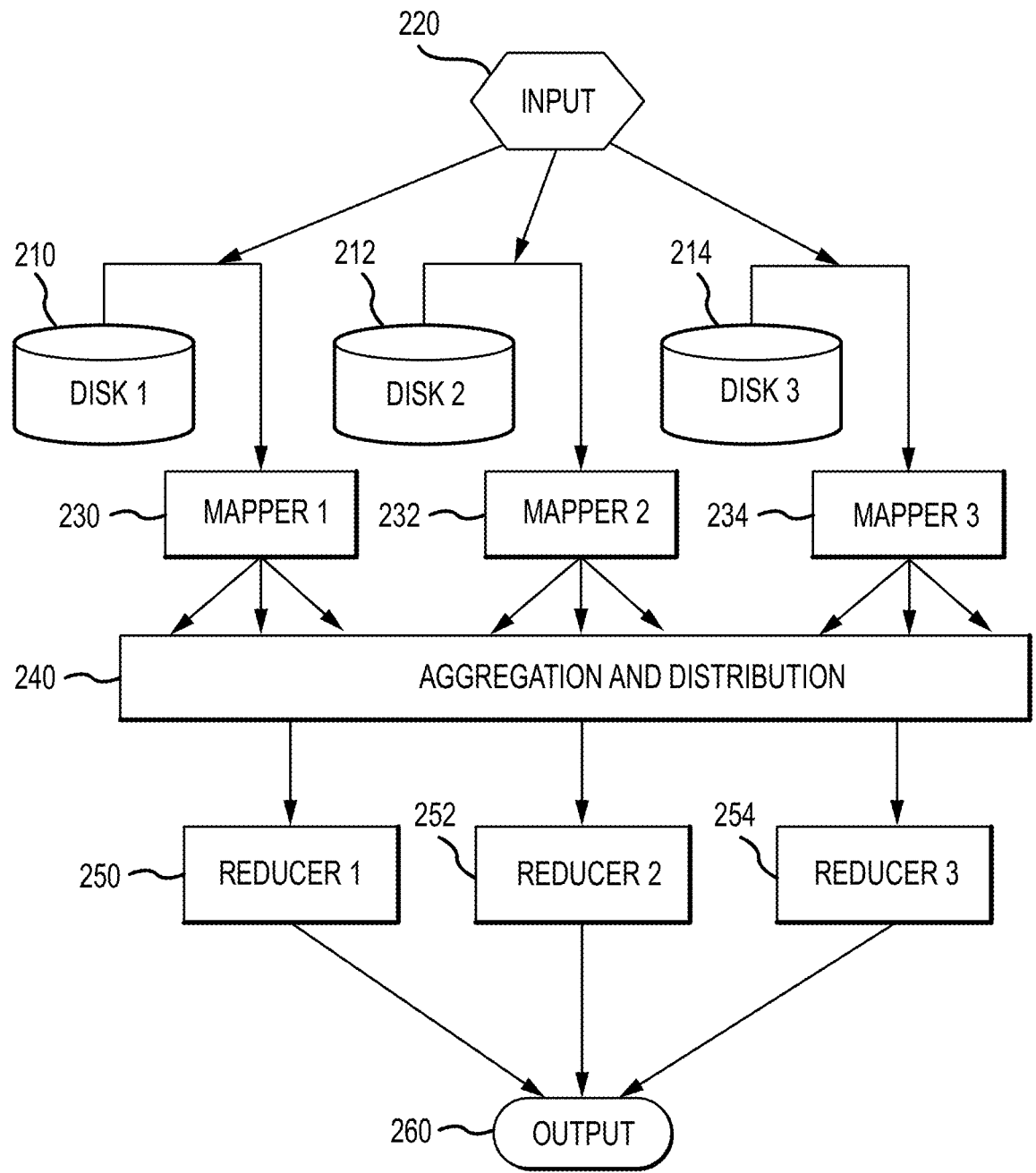
FIG. 2 depicts a prior system for executing a MapReduce data processing function.

With reference to FIG. 2, an example MapReduce framework is depicted. Two or more data sources (210, 212, 214) store data to be processed. While three of each are depicted, there may be additional data sources, mapping components, and/or reducing components as required by a particular framework. An input source 220 establishes the rules for processing the data and formats the data from each source into key value pairs (k, v). The formatted data from each source is provided to a mapping component (230, 232, 234). Each mapping component processes its respective input data independently according to functions from the input source 220 and maps the data into new intermediate key value pairs, e.g., (k1, v . . . ) (k2, v . . . ) (k3, v . . . ) etc. The mapped data is then provided to a component 240 that aggregates the results from the mapping components 230, 232, 234, and distributes the intermediate key value pairs with a common key to the appropriate reducing component 250, 252, 254 having the shared key. For example, all intermediate key 1 values (k1, v . . . ) would be sent to the first reducing component 250, all key 2 values (k2, v . . . ) would be sent to the second 252, and all key 3 values (k3, v . . . ) would be sent to the third 254. The reducing components 250, 252, 254 processes the intermediate data according to functions from the input source 220, and the results are synthesized and provided as output 260.

Decision-Making Framework

In a similar way, many complex, enterprise-level decision-making problems or tasks can be adapted to a framework of multiple interacting decision loops. Each loop in the framework independently performs some version of the following steps: Receive, Interpret, Decide, Execute, and Self-Monitor ("RIDES"), known herein as the RIDES Loop Architecture. The RIDES Loop Architecture supports multiple loops interacting with one another in hierarchical and peer relationships as part of an enterprise. Individual loops produce outputs used by the enterprise, either directly or as contributions to the inputs of one or more loops also operating within the enterprise. This framework of interacting loops becomes a distributed decision-making system, wherein each loop is responsible for making discrete decisions based on a subset of available information that contribute to the decision-making task of the larger enterprise. The decisions made by an individual loop are then available to influence the decisions in other loops. This framework allows complex decision-making systems to be broken down and distributed to individual RIDES Loops for processing, greatly standardizing and simplifying the software implementation required for such undertakings. Examples of systems that could be modeled using RIDES Loops include hospital scheduling and operations, vehicle fleet management, intelligence and reconnaissance planning and scheduling, power plant operations, autonomous vehicle operation, and other undertakings where multiple decision-making processes interact to perform a complex task.

Figure 3:
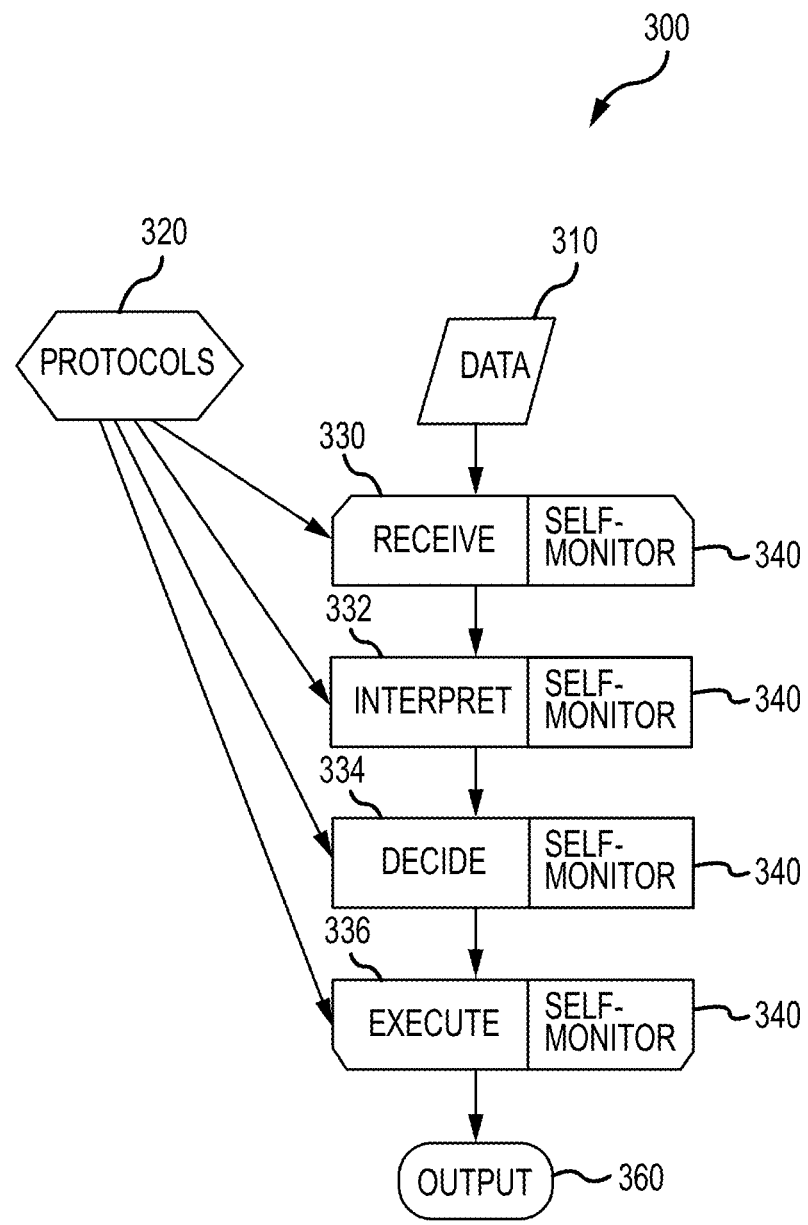
FIG. 3 depicts a flow diagram representing embodiments of the disclosed automated decision-making system.

With reference to FIG. 3, an exemplary version of the disclosed framework is depicted. The RIDES Loop 300 first includes a Receive step 330 in which the loop takes in data 310 from an external source, such as a sensor operating in the external environment, another networked system, such as another decision-making loop, or an internal source, e.g., a loop's own output from a previously executed loop cycle, and packages the data for use by the framework. The system then performs an Interpret step 332, in which the process performs operations to interpret the data received in the Receive step according to a set of criteria, which may include historical data retained from previous loop cycles, or information acquired through internal or external models, e.g., machine learning applications. Next, the system performs a Decide step 334 in which the loop makes a decision about an action to take, which may include the choice not to act. Next the system performs an Execute step 336 to act upon the decision made in the Decide step and produces an output 360. Execution may entail a range of actions to include taking no action, communicating a decision back to the loop itself, relaying a decision to another system or process e.g., another RIDES Loop, updating or modifying the state of a variable or process, or taking a concrete step intended to affect the environment outside the process. In operation, an individual loop 300 will perform each step 330, 332, 334, 336, in sequence, either one time or zero times, as required for each finite set of data (a data packet) introduced into the loop in the Receive step. The loop then communicates the result as an output 360. The individual loop may also perform its actions iteratively, cycling through a plurality of 4-step sequences and evolving its activities in response to its own outputs and newly acquired inputs from outside the loop.

Concurrently with each step 330, 332, 334, 336, the process performs a Self-Monitor function 340. The step-level Self-Monitor functions monitor the performance and timeliness of each of the sequential steps according to a performance protocol. A protocol source 320 provides the internal performance protocols, including specification of a data format for each step, to allow sharing of outputs between steps. In addition, internal protocols include timeliness and responsiveness, e.g., computational validity, parameters that each step must communicate to the loop-level Self-Monitor function and adhere to. The protocol source 320 also provides external protocols that allow two or more independent loops to interact and share data in a standardized, predictable, and resilient manner.

In addition to the step-level Self-Monitor, there is also a loop-level Self-Monitor function that tracks individual step and overall loop performance. The loop-level Self-Monitor function monitors each of the step-level Self-Monitor functions to track each step's computational validity, and timeliness of data processing. By reference to the performance protocols for each sequential step, and using each step's published timeliness and responsiveness scores, the loop-level Self-Monitor function can also independently identify failures or degradations of each step. To be useful, Self-Monitor functions must adhere to timeliness rules determined by step and loop processing durations. For example, the step-level Self-Monitor function must report step performance at a rate corresponding to the expected execution time of each sequential step. For a loop in which each step can be completed in a few milliseconds, each step-level Self-Monitor function must report performance on the millisecond scale. Similarly, the loop-level Self-Monitor function also reports on the overall performance of the loop at an interval corresponding to the expected execution time of the entire loop. The loop-level Self-Monitor function controls the sequential steps that it directly monitors, as well as any loops nested within those steps. Control of a step includes starting or restarting the step, directing it to use alternate communication paths to subsequent steps, or even redeploying or rehosting the step if operating within a containerized or virtualized environment.

With reference to FIGS. 4A through 4E, a single RIDES loop can perform operations on multiple independent sets of data in series or in parallel, and synchronously or asynchronously. For purposes of describing parallel processing, a loop begins processing a data packet when the packet begins the Interpret step. During the Receive step, the loop is said to collect and package data rather than process the data. A RIDES loop can process data packets synchronously, meaning the loop completes processing a data packet before beginning to process the subsequent data packets. For example, the loop completes the Execute step for a first data packet before beginning the Interpret step on a second data packet. A RIDES loop can also process data asynchronously, meaning the loop can process a data packet while also processing subsequent data packets. On each of the FIGS. 4A to 4E, the horizontal arrow 12 represents time, and the horizontal length of each box represents the duration that a RIDE step is operating on a data packet. The rows 400, 410, 420, and 430 represent the Receive, Interpret, Decide, and Execute steps, respectively. The numbers in each box represent the data packet being operated on by a step at a given time. Further, in FIGS. 4A to 4C, the duration to receive Data Packet 1 at the Receive step 400 is only partially shown.

Figure 4A:
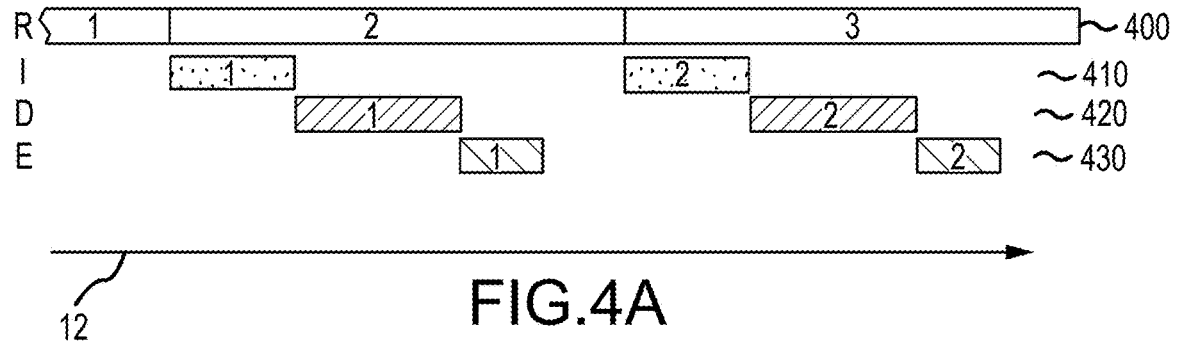
FIGS. 4A through 4E depict block diagrams representing processing schemes of embodiments of the disclosed automated decision-making system.
Figure 4B:
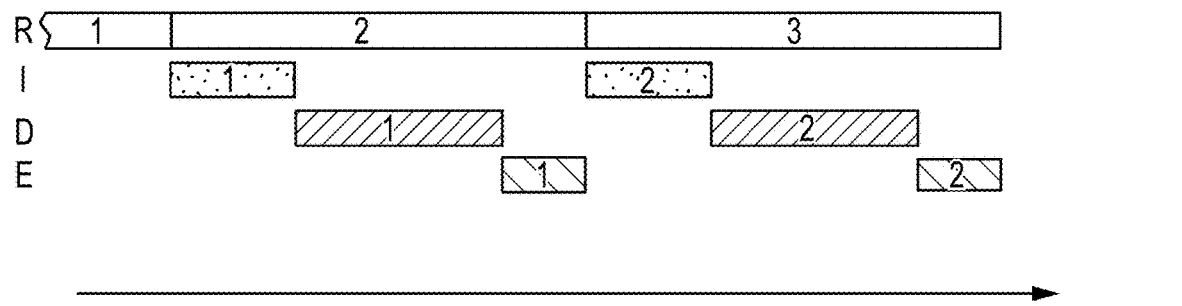

With reference to FIGS. 4A and 4B, exemplary synchronous processing approaches are depicted. In FIG. 4A, the Receive step 400 is longer than the Interpret 410, Decide 420, and Execute 430 steps combined. In this example, the loop is able to complete the Interpret, Decide, and Execute steps for Data Packet 1 during the Receive step for Data Packet 2, but must wait until that step completes before continuing to process Data Packet 2. As shown, the loop first receives data at the Receive step 400 for Data Packet 1, then begins to receive data for the Receive step for Data Packet 2. Simultaneously, the loop begins the Interpret step 410 for Data Packet 1. Upon completion of the Interpret step 410 for Data Packet 1, the loop begins the Decide step 420 for Data Packet 1, and then upon the completion of that step, begins the Execute step 430 for Data Packet 1. Data Packet 2 is processed in a similar way, wherein the Interpret step 410 begins at the completion of the Receive step 400 for Data Packet 2, and so on. FIG. 4B depicts a synchronous processing approach wherein the Receive step 400 duration is equal to the combined duration of the Interpret, Decide, and Execute steps. In this example, the loop completes the RIDE steps for Data Packet 1 at the same time as it completes the Receive step for Data Packet 2, and therefore is able to proceed immediately with the Interpret step for Data Packet 2, and so on.

Figure 4C:
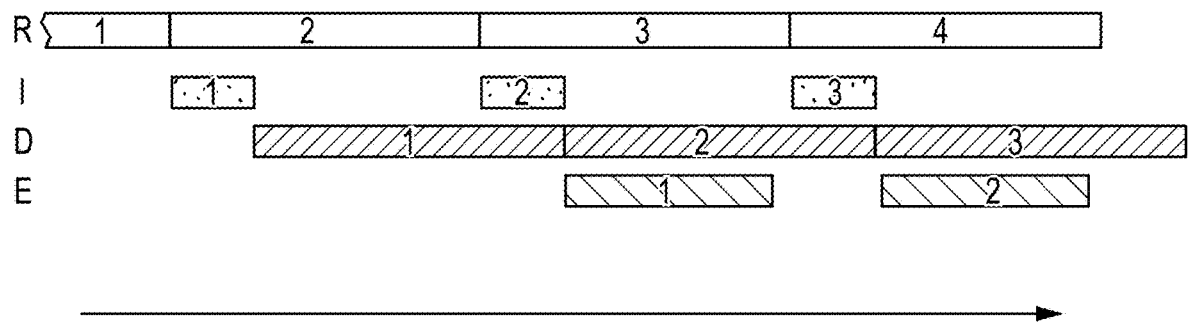

With reference to FIG. 4C, an exemplary asynchronous processing approach without parallelization is shown. In FIG. 4C, the duration of the Receive step 400 is equal to the duration of the longest other sequential step, in this case, the Decide step 430. In asynchronous, non-parallel processing, the loop completes the Receive step 400 on Data Packet 1, then begins the Receive step for Data Packet 2. Simultaneously, the loop begins the Interpret step 410 for Data Packet 1. Each sequential step for a given data packet can only begin when the previous step is complete. However, since the loop is asynchronous, it begins processing Data Packet 2 while still performing work on Data Packet 1. FIG. 4C depicts an optimal throughput for an asynchronous loop without parallelization in the processing steps, since the receive duration is equal to the maximum duration of the other steps, in this case the Decide step.

Figure 4D:
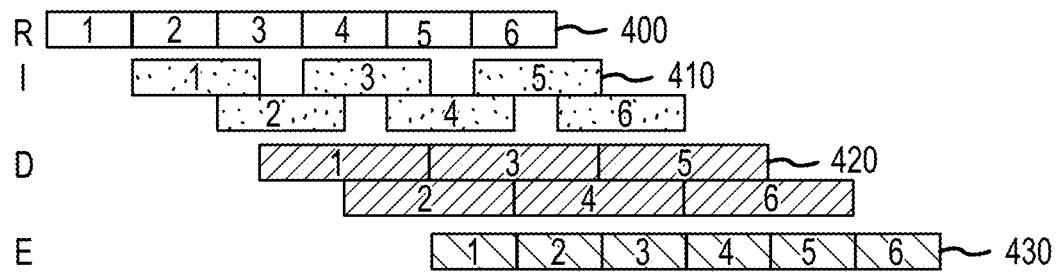
Figure 4E:
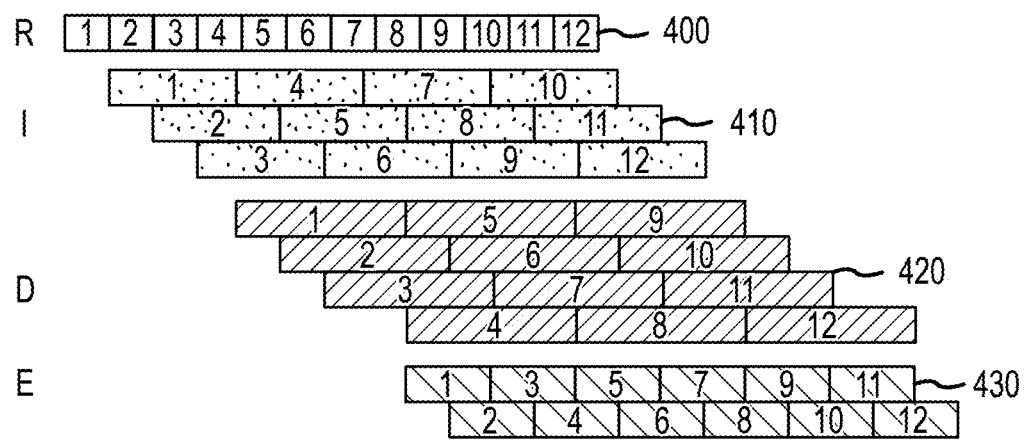

With reference to FIGS. 4D and 4E an example asynchronous processing approach with parallelization is depicted. Using FIG. 4D as an example, the amount of available parallelization for a given loop is dependent on the duration of the Receive step 400. Specifically, each processing row 410, 420, 430 has a parallelization factor determined by the formula P=Step Duration/Receive duration, where P is the parallelization factor, Step Duration is the amount of time required to perform a processing step on a data packet and Receive Duration is the amount of time required to perform the Receive step on a data packet. As shown, the durations of the Receive step and the Execute step are the same, giving a parallelization factor of 1 for the Execute row. The Interpret step duration is 1.5 times the Receive step duration, giving a parallelization factor of 1.5 for the Interpret row. Lastly, the Decide step, here the longest processing step in the loop, has a duration of 2 times the Receive step duration, giving the Decide row a parallelization factor of 2. In operation, this loop completes the Receive step for Data Packet 1, then begins the Receive step for Data Packet 2. Simultaneously, the loop begins the Interpret step 410 for Data Packet 1. Once the loop completes the Receive step for Data Packet 2, it begins the Receive step for Data Packet 3, while simultaneously beginning the Interpret step for Data Packet 2. Notice that the loop is processing the Interpret steps for both Data Packet 1 and Data Packet 2 in parallel for a period of time. Next, as the loop completes the Interpret step for Data Packet 1, it begins the Decide step 420 for Data Packet 1. Another notable feature of this example is the time delay between the end of the Interpret step of Data Packet 1 and the beginning of the Interpret step for Data Packet 3. Such delays are caused by the loop having to wait REPLACEMENT PAGE until the completion of the Receive step for Data Packet 3 before the Interpret step can be initiated. In other words, since the Interpret row's parallelization factor is between 2 and 1, there are periods when the loop can only process one data packet in that row. In the Decide step 420, the loop can immediately process Data Packet 3 upon the completion of Data Packet 1 (while continuing to process Data Packet 2), because parallelization in the Interpret row already allowed the loop to complete the Interpret step for Data Packet 3. Similarly, the Decide step for Data Packet 4 can begin immediately after the Decide step of Data Packet 2, while the loop continues to process the Decide step for Data Packet 3. Finally, the loop is able to run the Execute steps 430 for each data packet back-to-back because of parallel processing in the prior steps.

FIG. 4E depicts an example loop showing parallelization in all processing steps. The Receive row 400 is, by definition, limited to a parallelization factor of 1. The Interpret row has a parallelization factor of 3, indicating that interpreting a data packet takes 3 times as long as the time required to receive a data packet. Similarly, the Decide row has a parallelization factor of 4, because the loop needs 4 times the duration of the Receive step to decide on a course of action. Finally, the Execute row has a parallelization factor of 2 because the loop requires two times the Receive step duration to execute a decision. Notice that with each processing row 410, 420, 430 having whole number parallelization factors, the loop can process data packets back-to-back in all of them. Together, the FIGS. 4A to 4E depict strategies the RIDES Infrastructure can take to alleviate processing bottlenecks. Generally, the loop's Self Monitor function will initialize processing steps with a parallelization factor determined from the Performance Contract for a step, e.g., if the Performance Contract indicates an expected Interpret step processing duration to be 3.6 times the nominal Receive duration, the Interpret row will be initialized with a parallelization factor set to 4. The corrective actions that the Self-Monitor and Error Handling components can take to resolve processing bottlenecks by utilizing the different synchronous and parallelization modes are discussed in more detail below.

Figure 5:
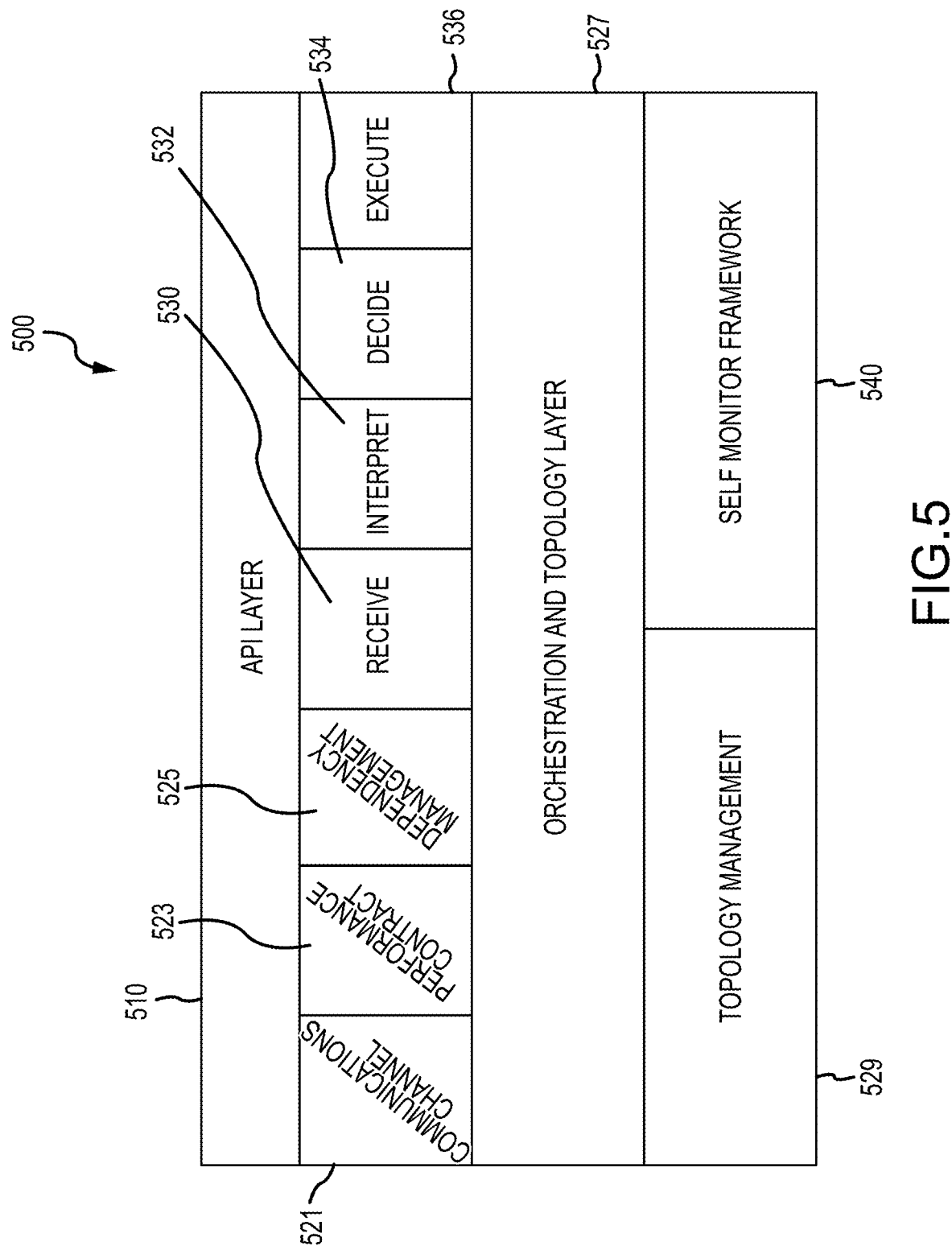
FIG. 5 depicts a block diagram representing embodiments of the disclosed automated decision-making system.

With reference to FIG. 5, the RIDES Loop Architecture 500 is depicted with its basic components. The structure includes an application programming interface (API) layer 510 to facilitate communication with each of the second level peer components. The second level includes the four sequential RIDE modules 530, 532, 534, 536, and additionally includes three facilitator modules: a communications channel 521, a performance contract module 523, and a set of containers, dependencies and bundled libraries 525. On a third level, the architecture includes an orchestration and topology layer 527 that includes a topology management module 529, and the Self-Monitor framework 540.

Figure 6:
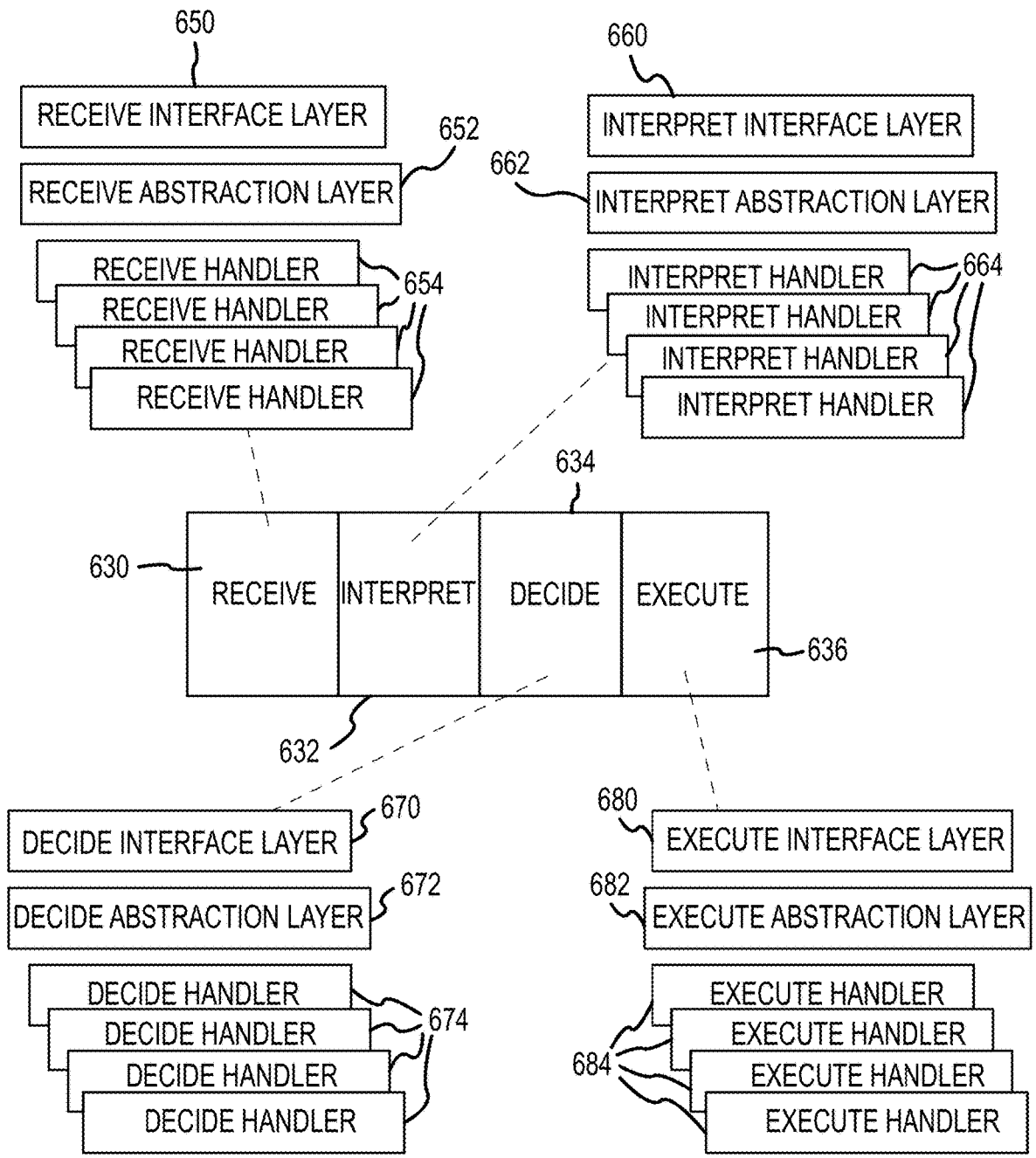
FIG. 6 depicts a portion of a block diagram representing embodiments of the disclosed automated decision-making system.

With reference to FIG. 6, the internal structure of the Receive 630, Interpret 632, Decide 634, and Execute 636 modules is depicted. As part of the framework's API there is an interface layer and an abstraction layer for each sequential module. For example, for the Receive module 630, the framework includes a Receive interface layer 650 comprising a set of interface definitions to facilitate communication, data transfer, and self-monitoring between the loop and the Receive module 630. The framework also includes an abstraction layer 652 for the Receive module

630. The abstraction layer 652 defines the Receive module programming object and establishes the rules for the Receive module's role in the loop. The abstraction layer may be written in Java, other programming languages, or may be language agnostic. Beneath the interface layer 650 and abstraction layer 652, the Receive module includes one or more implementation handlers 654 (four are shown) that define the business or domain logic required to implement the Receive function of the loop. The Receive handlers 654 contain the specific rules for the creation, storage, and transformation of data for the Receive function. The Receive handlers establish the platform, process, and system framework for the module. Each of the other sequential modules has a corresponding structure, i.e., the Interpret module 632 has components 660, 662, 664, the Decide module has components 670, 672, 674, and the Execute module 636 has components 680, 682, 684, to establish loop interaction with the module and define each module's role within the loop.

A chief innovation of the RIDES Loop Architecture is that only the handlers 654, 664, 674, 684, and for multiple-loop enterprises, a topology definition (see FIG. 5, 527), have to be customized or implemented to configure the RIDES Loop for a given decision-making process. The other components of the framework are standardized for use with any such process, or may be adapted to new applications with little custom code. For example, a RIDES Loop is configured to track a moving object, such as a cruise missile, and operates within a larger enterprise comprised of many other loops performing their own decision-making tasks. To configure the missile tracking loop, a software developer would write a Receive handler 654 programmed to obtain details about the objects to be tracked, such as missile performance parameters, and establish procedures to interact with event processing systems to obtain relevant environmental observations and missile status, e.g., detected movements, and weather observations, as well as write procedures to collect information about the larger enterprise, e.g., tracked object priority changes, or loss of computing resources. The developer would also write instructions for how to bundle the received information for use by the Interpret module 632. The developer would also need to write a custom Interpret handler 664 to take the raw information from the Receive module 630 and filter out irrelevant data, e.g., by comparing the raw data to historical movement patterns and location accuracy predictions. The developer then would specify how to assemble the refined data into a single object for use by the Decide module 634. The developer would write a Decide handler 674 to determine if the filtered data required any modifications to the existing execution plan, e.g., the missile's current location and trajectory may require a reallocation of active sensor resources to maintain contact, etc. The Decide handler 674 would also be programmed to use the filtered information to determine the value of a revised tasking, e.g., the tracked missile has impacted the ground and now has a lower priority than another object. The Decide handler would be programmed to determine the course of action and package it for use by the Execute module 536. Finally, the developer would write an Execute handler 684 to take the decision made and develop an implementation plan for its execution. The Execute handler would also package the execution plan and provide it to the appropriate system(s), e.g., back to the Receive module 630, to the parent loop, or to another system.

Only the RIDE handlers 654, 664, 674, 684 have to be custom implemented to adapt any individual loop to a particular decision-making process and to integrate a loop into a larger enterprise of loops, including a plurality of loops performing the same function or capable of being re-tasked to perform a given function. Because an individual loop can be easily integrated into a larger enterprise, redundancy, error monitoring, and error mitigation become straightforward. The RIDES Loop Architecture therefore provides each individual loop the resilience and performance guarantees associated with being part of a larger framework. Furthermore, because the programming required to customize a loop to a particular task is minimized, it becomes feasible to apply the RIDES Loop Architecture to solve exceedingly complex workflows while still maintaining predictable failure modes.

Figure 7:
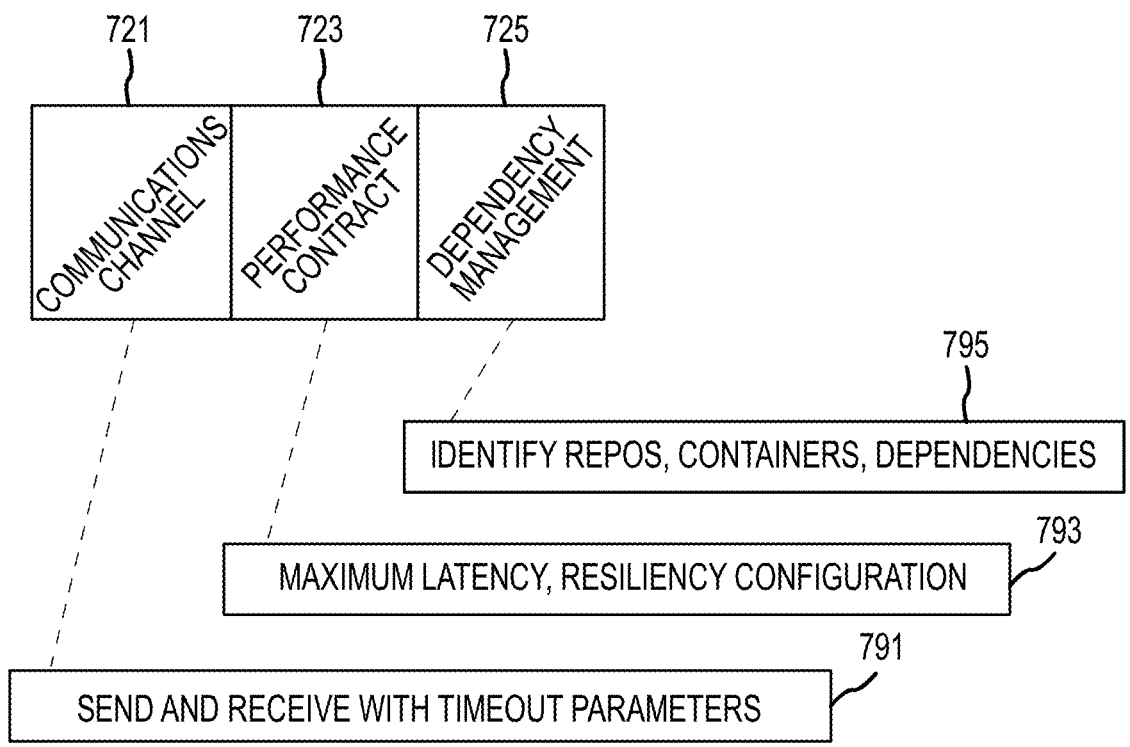
FIG. 7 depicts a portion of a block diagram representing embodiments of the disclosed automated decision-making system.

With reference to FIG. 7, the three facilitator modules (see FIG. 6, 621, 623, 625) that together with the RIDE modules, form the second level of the loop architecture are depicted. A communications channel module 721 includes an abstracted transport layer to enable communication within the loop, and with other loops connected within the same network topology. The transport layer may, for example, include a network socket, notification service, queue management, topic, or various communication hardware interfaces. By wrapping communication hardware links in the abstracted transport layer, the framework can automatically react to communication delays or broken links by reverting to a backup communication channel, by taking the loop offline so that it operates in autonomous mode, or by failing the entire loop and reverting the loop's tasking to a backup system with an operational communication channel. The channel module 721 also establishes protocols for information flow internally across the loop and externally at the input (Receive module) and output (Execute module) steps. For example, these information protocols establish send and receive data configuration parameters, as well as timeout requirements. Specified timeout limits establish the maximum elapsed time it should take a module to send or receive a communication on a channel, thus allowing the loop to self-monitor performance, and at the enterprise level, allows the framework to take corrective actions. Next, a performance contract module 723 defines a maximum latency time, and in the event the latency maximum is exceeded, establishes a corresponding resiliency configuration, which details contingencies in the event of channel failure to allow the loop to continue functioning. For example, if a Receive module was scheduled to send output data to the Interpret module, but the maximum time elapsed before the data was received, the loop would determine that the channel had failed, and command the Receive loop resend the data via a designated back-up channel. Finally, a dependency management module 725 component handles various software and data elements that facilitate and simplify the loop's deployment and interaction with external systems. For example, the module 725 may serve as a centralized storage location for the third-party software modules and external data libraries required for loop operation. In some embodiments, this module 725 may include containerized software modules, e.g., Docker, or Kubernetes, to provide a further abstracted and portable API.

With reference to FIG. 8, the loop orchestration and topology layer 827 is depicted. The orchestration and topology layer 827 includes a topology management component 829 and a Self-Monitor framework component 820. The orchestration and topology layer 827 generally allows the loop to implement a defined topology and the associated runtime management procedures that allow the loop to self-monitor. In addition to the development of the custom RIDE handlers for individual loops, when constructing an enterprise of multiple loops, a developer also must custom define a topology for the enterprise. Since individual loops may be nested in superior loops in various combinations and configurations, topology definition includes specifying how each loop fits into the overall enterprise, i.e., how all of the loops in the enterprise are interrelated, which loops use the output of which other loops, and the corresponding timing requirements for outputs to allow the enterprise to operate. The topology is then submitted as input to the RIDES framework. With the exception of the topology definition specification, which would be contained in a properties file, e.g., a json or xml document, the orchestration and topology layer components are part of the established RIDES Loop Architecture, and do not have to be custom written to apply to a specific RIDE configuration. The API layer (see FIG. 5, 510) also allows topologies to be dynamically modified during loop operation to adapt to changes in the enterprise, such as loss of communication channels, unreliable loops, etc.

The topology management component 829 includes a topology distillation and interpretation module 826. The distillation and interpretation module takes the custom defined topology and implements it for loop operation. Also included is an assembly and management module 828 that operationalizes the refined topology from the distillation and interpretation module 828. The assembly and management module 828 assembles and configures the refined topology, then starts and manages topology operation.

Also included in the orchestration and topology layer 827 is a Self-Monitor framework component 840. The Self-Monitor framework includes a loop performance guarantor 842, which monitors and ensures that each RIDE step is executing its operations within defined performance parameters, such as required accuracy and consistency specifications. The Self-Monitor component 840 also includes a module that implements loop step monitoring and error handler integration 844. The loop step monitor 844 collects performance and timing metrics from individual RIDE self-monitoring components (see FIG. 3, 340). In some embodiments, one or more custom error handlers are implemented for a loop, allowing the loop to conduct a particular response to a given error. In other embodiments, the Self-Monitor function is performed at the loop or framework level, and does not use individual RIDE Self-Monitor components.

The Self-Monitor function of the RIDES Architecture operates at multiple levels, and can choose among several available corrective actions to recover from or mitigate failures and provide resilience. Accordingly, error detection can occur at multiple levels within a loop or system of loops. The Self-Monitor function can detect a communications channel failure at either the send or the receive end of the channel, i.e., an exception handler detects the failure at the loop level, or the failure is detected when a sequential step or nested loop exceeded its latency parameters. For example, if an individual Decide step failed, either the Loop Self-Monitor function (which tracks overall data packet flow through the loop) would detect the failure directly, or the Execute step Self-Monitor function would detect and then report the failure to the Loop Self-Monitor function. Sequential step failures are recognized either when the step produces invalid or malformed data, or when the step duration exceeds performance specifications. Further, in a system of loops, the framework-level Self-Monitor function would detect an individual loop failure at the framework level as a redundant means of detecting errors.

Not only can error detection occur at multiple levels, but RIDES Loop Architecture also can take corrective actions at the loop level or at the framework level. For communication channel failures, a restart of the send process or the receive process may restore function, or the loop may elect to reroute communications to a backup or redundant channel. For failure of sequential RIDE steps, the loop may opt to take one of several actions depending on the circumstances. For example, if a sequential step exceeds latency requirements, but still completes its operations on a data packet, the loop may elect to increase the parallelization for that step. To illustrate, assume the Interpret row is assigned an initial parallelization factor of 3. As the loop operates, individual Interpret steps begin to fall behind and exceed their latency requirements. Because the Interpret steps have now become a data bottleneck for the loop, the framework increases the parallelization factor on that step automatically, initially to 4, and if necessary, up to a configured or practical maximum.

If increasing the parallelization on the step fails to solve the data bottleneck, the Loop Self-Monitor function can examine the communication channels associated with the Interpret step and take any necessary corrective actions. If the Interpret steps still fail to meet latency requirements, the Self-Monitor function can restart the Interpret step, restart the loop, or even rehost the Interpret step or the loop on backup physical hardware. If none of those corrective actions solve the problem, the Self-Monitor function can take the loop offline to prevent failures from cascading to other loops in the enterprise. Similarly, if an entire loop experiences a failure, the Self-Monitor function can restart the loop, rehost the loop, or take the failed loop offline. With each corrective action and system response, the Self-Monitor function reports its activities and the operational status of the individual component and/or entire loop to a superior loop, or a user, as appropriate.

In some cases, processing errors in a loop or step are the result of one or more corrupted data packet(s), rather than an error with the loop itself. For example, if the Decide step exceeds latency requirements on a data packet, but meets its latency requirements on other data packets, the Self-Monitor function can conclude that loop or loop component operation is within parameters, and instead take corrective action on the data packet. Such corrective action will be dependent on the task performed by the loop. In some cases, the Self-Monitor function may restart a step or loop without using the corrupted data packet, and instead reusing the last uncorrupted data packet or using the next uncorrupted data packet for the restarted step or loop. In other cases, the loop may need to be taken off-line to avoid corrupting the results by use of corrupted data. In some embodiments, the disclosed invention formulates and executes complex error recovery and mitigation rules through use of machine learning or artificial intelligence methodologies.

Loop topology and self-monitoring of loop timeliness are closely related. In some embodiments of the disclosed RIDES Loop Architecture, subordinate loops are nested within the Receive and Execute steps, but not within the Interpret or Decide steps. In such configurations, the nested loops in the Receive step may operate at time scales independent of the superior loop. The superior loop Receive step collects data from the nested loop when it is available, or it may proceed without data from the subordinate loop if it is unavailable. However, subordinate loops nested within the Execute step directly influence the timeliness of superior loop, since the successful completion of the superior loop's Execute step requires output from the nested loop(s). This means that a superior loop with subordinate loops nested in its Execute step can perform no faster than the slowest nested loop within it, and the acceptable performance envelope of a system comprised of one or more nested loops is derived from the performance parameters of each loop in the system. The performance protocol and assessment of the nested loop can thus influence the performance protocol and assessment of the superior loop. Therefore, the performance of a nested loop may alter the performance of a superior loop, and the nested loop performance would be reported by the superior Self-Monitor function to other superior or peer-level loops, as applicable.

Use of nested RIDES loops allows decision making to be distributed to different loops operating on different time scales. Loop distribution within a larger enterprise may consider such time scales when strategically distributing individual loops within the enterprise. For example, an environmental sensor might have a communications link that is susceptible to jamming in a certain RF spectrum, but would have backup channels available when jamming is detected. The backup channel might be less capable than the primary channel, and therefore would limit the types of tasking the sensor could perform when using the backup channel. This sensor system might implement a Jamming Detection loop to sample the environment, compare it against baseline models, and decide if jamming in a particular frequency band is present. The sensor system may also use a Tasking loop to establish tasking schedules and choose sensor configurations based on the priorities of a larger enterprise. Since enterprise and individual loop priorities may change at different timescales than the RF environment, a system designer may choose to make the faster Jamming Detection loop output an input to the slower Tasking loop. Such an arrangement would allow the enterprise to properly use information generated from each loop. Specifically, the Tasking loop could use contextual information about tasks actively under execution and compare the information to historical information about jamming activities in the RF environment. Such integrated use of contemporary and historical data would assist the system to respond appropriately to detected jamming, while minimizing unnecessary configuration changes in dynamic environments.

The RIDES Loop Architecture allows orchestrator-to-orchestrator interoperability because each loop, nested or superior, acts as a core process. A core process has its own inputs, makes decisions based on its own requirements and policy constraints, and can output data about the decision it made to any specified communication channel.

RIDES Loop Architecture is inherently configured to provide a level of security for its operations. Each loop is established with defined input and output channels, and standardized data labeling protocols. Further, each loop can be configured with safeguards that ensure the loop can only process data at an allowed classification level or access restriction that can be enforced at the framework level of a loop. For example, computer systems running a loop may be cleared to work only with information classified up to the Secret level. If information requiring Top Secret (TS) or Special Compartmented Information (SCI) access were required input, the loop framework could reject the tasking and order the task rehosted to another loop hosted at a higher classification. Since this decision takes place at the framework level, i.e., the security check is performed before the processing flow enters custom code written for a given loop, the system is not as vulnerable to individual coding errors or failure of custom code to meet security requirements. Similarly, if incorporated into an enterprise, a loop's framework topology may track classification levels for loops and potential back-up loops to ensure the proper level of security is maintained in the event of a channel or system failure. Other restrictions besides classification levels may also be considered, such as restriction to no foreign nationals, security program read-in for loop users, the government agency operating or consuming loop output, or other suitable restriction. In other contexts, loop operation may have security protocols to protect attorney-client privileged information, trade secrets, personally identifiable information, medical information, or time-sensitive information.

RIDES Loop Architecture also provides inherent redundancy and resiliency to decision-making enterprises. Through the communication channel (see FIG. 5, 521), the RIDES Loop Architecture provides a standardized manner to notify other loops in an enterprise, and to take corrective action if a given communications channel becomes unresponsive or unreliable. Every loop within an enterprise has performance guarantees built into its communications channel, so the individual loop and loops in the larger enterprise will recognize any delays, missed messages, or degraded communications, and can take autonomous standardized action to find back-up channels. Similarly, resiliency mechanisms are standardized and performed at the framework level to coordinate and simplify the process of dynamically allocating resources when individual channels fail. Superior loop coordination of resource allocation avoids the dramatic explosion of complexity that can result when independent applications perform such actions without coordination.

Resiliency coordination by a superior loop of nested loops operating within it depends on the time scale and latency protocols of the nested loops. For example, a superior loop may have one or more subordinate loops nested within its Receive step. The subordinate loops may operate on their own time scales, with the superior loop reading their outputs when available. However, if a subordinate loop fails to provide output within its required timeout limit, the superior loop may mark the subordinate lop as failed and the framework will attempt to restart the subordinate loop or find a back-up. Likewise, a superior loop may have one or more subordinate loops nested within its Execute step. In such cases, the superior loop must execute its decision synchronously, meaning it must execute its decision before the loop cycle is deemed complete. For synchronous loops, subordinate loops nested in the Execute step affect the latency of the superior loop, since the superior loop can complete operation no faster than its nested loops. Once again, if a nested loop failed to meet its latency obligations, the superior loop may deem it failed and either restart or bypass the nested loop. In this way, the RIDES Loop Architecture provides effective dynamic resiliency for complex enterprises.

Expected Value Based Scheduling

An exemplary application for the disclosed RIDES Loop Architecture is as part of an expected value-based dynamic scheduling system (EVDS). An EVDS incorporating RIDES Loops technology may be configured to optimize a schedule according to a metric that models or approximates the expected value to be realized by executing the schedule. Developing schedules for large, complex organizations is currently a daunting task that depends on the availability of a large number of individuals having specific skill sets, operating in a dynamic environment. For example, scheduling physicians and nurses for coverage of hospital shifts, scheduling flight crew for commercial airline flights, providing reconnaissance coverage for a selected geographic area, manufacturing or construction project management, or other suitable application.

Performing EVDS through use of RIDES Loop Architecture is premised on the expected value of each task comprising the schedule. Prior to building the schedule, each task is given a starting or default expected value. For example, one shift worked by an anesthesiologist may receive a value x, while a shift worked by a cardiac specialist may be valued at y, where the default value is x>y. Once the scheduling period begins, the expected value of each task may change according to a number of factors, such as how the task is performed, or relative importance of the task within a subsequent schedule iteration. For example, the anesthesiologist worked her shift, but was unable to attend all scheduled surgeries, therefore, her shift had a lower value than its expected value, and the subsequent anesthesiology shift increases in expected value. Similarly, a heat wave causes an increase in hospital admissions, resulting in an increased expected value for cardiac specialists in subsequent schedule iterations.

Such dynamic changes to the expected value of events may be modeled by a system of RIDES Loop. The enterprise loop would manage the overall scheduling task, while subordinate loops model discrete decision-making tasks within the enterprise. One such subordinate loop, the expected value loop, may dynamically model changes to the expected value of one or more scheduled events. The expected value loop includes a Receive step that collects information from the environment. The collected data is processed by a Interpret step, where relevant information is retained and organized according to its impact on a task and the personnel relevant to the task. A Decide step applies the information to recalculate the expected value of tasks, and an Execute step provides the new expected value to a superior loop as output. Based on the received information, the loop adjusts the value of individual factors according to how well the task conformed to the ideal. Once all of the factors for a task are adjusted, a new expected value for the task is determined. The new expected value is provided as output and received by a superior RIDES Loop, which may, for example, collect new expected values from a number of tasks in order to reallocate scheduling resources according to the new values.

Figure 9A:
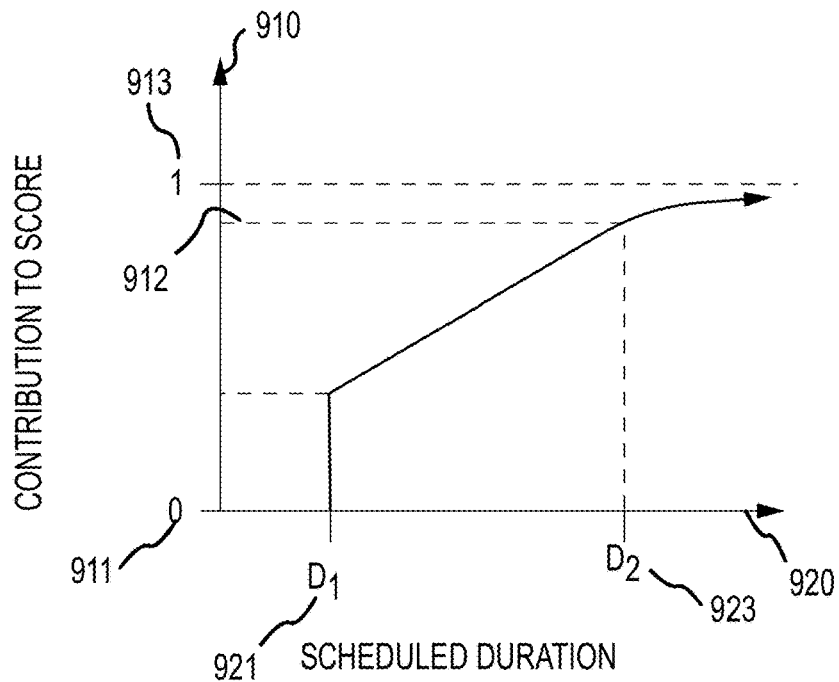
FIGS. 9A and 9B depict a graph illustrating an aspect of the disclosed expected value scheduling system.

To illustrate how expected value changes may be modeled, each task may be assigned a maximum expected value, and the calculated expected value is modeled as a product of the maximum value and one or more factors. Each factor represents a specific feature of the task and is assigned a value between 0 and 1 to represent how well the scheduled task meets the feature modeled by the factor, with 1 representing ideal conformance to the factor and 0 representing conditions where the task might be scheduled, but would not contribute value to the overall schedule. One such valuation factor, D, may be for the duration of performance for a scheduled task, as illustrated by FIG. 9A. A graph is depicted having the factor's contribution to score on the y-axis 910, and the scheduled duration on the x-axis 920. If the maximum value of the task is 1 (D=1) the graph shows that if the task duration is less than $d_1$ (921), the value of the task is 0 (911), but as the duration increases to $d_2$ (923), the value increases toward the maximum value of 1 (912). However, if more time is allotted to the task than $d_2$, there are diminishing marginal returns 913. Since there are diminishing returns for increasing the time allotted to the task, competition for the affected resource would likely mean that a scheduling algorithm that attempts to maximize value would notice that a different task would achieve more value from the resource, resulting in a reallocation of the resource to the other task. In this way, the valuation factor D is used to model the effect on expected value resulting from the task's scheduled duration. Similarly, other aspects of task scheduling may be assigned a factor that can be modeled, e.g., when the task is scheduled in relation to another event or task in the scheduled enterprise.

Figure 9B:
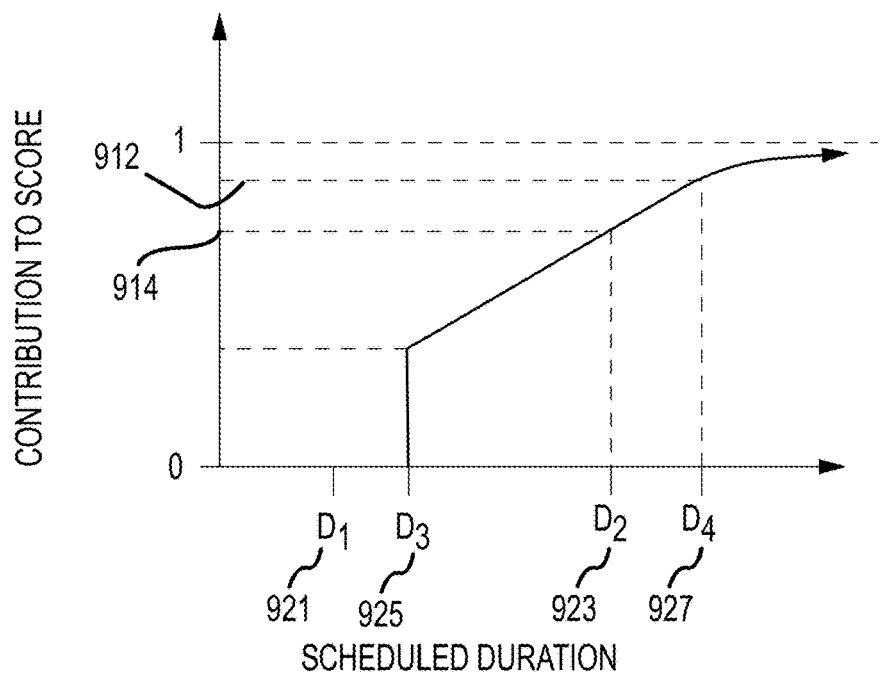

In addition to dynamically adjusting the expected value of a given task, the weights of individual factors may also be dynamically adjusted by use of nested RIDES Loops. For example, the factor D modeling the duration of a task, such as that in FIG. 9B, may require a different value based on events occurring in the environment that affect the ideal duration of the task. To illustrate, assume the task at issue is a radio frequency (RF) signal collection having an ideal duration in a given signal environment, where the signal environment is a level of congestion by signals in a geographic area. The signal collection task has an ideal initial duration $d_2$ that has a value approaching D=1. However, for subsequent iterations, the signal environment becomes denser than expected, increasing both the minimum duration $d_3$ (925) as well as the ideal duration of collection $d_4$, (927) meaning that the RF collection task in that area now requires additional duration to achieve the same expected results. Compared to the previous example, increasing collection time longer than $d_2$ and up to $d_4$ would have higher marginal value than in the sparser environment, increasing the likelihood that the collection task would win out in a competition for resources against other tasks. By dynamically adjusting the expected value of tasks based on collected event information, the EVDS recognizes and accounts for changes in the environment that render the task at a scheduled duration more or less valuable. Through subsequent iterations of the RIDES Loop, the EVDS could weigh the relative benefits of reallocating resources to adjust the task duration, or reallocating resources to a different task that would provide more value.

In some embodiments, actual scheduling outcomes can be used as another means to provide dynamic feedback into an EVDS system. In other words, information gained from an observed value of the schedule produced by earlier iterations of the RIDES Loop can be used to adjust factors used in subsequent iterations. Continuing the example from above, if the schedule were executed with the signal collection task scheduled for a duration of $d_3$ (the modeled minimum duration) and the collection produced good results, this information could be used to adjust the duration factor D so that the duration $d_3$ would be assigned a higher expected value for subsequent iterations of the schedule. Conversely, if the signal collection task were scheduled for a duration of $d_4$ (the modeled optimal duration) and a poor outcome were observed, the duration factor D could be adjusted so that the duration $d_4$ would be assigned a lower expected value for subsequent iterations of the schedule.

The disclosed EVDS may also model business, legal, operational, or other aspects of the environment as value-contributing aspects to the schedule. For example, keeping a schedule consistent in the short term may be valuable for improving staff morale. Accordingly, a factor may model schedule consistency, with a value assigned to the number of schedule changes to be made in the next hour, such that the value of the component decreases as the number of near-term changes increases. Using such a factor would avoid radical scheduling changes in the near term unless the value of those changes outweighed the value of a stable schedule. Similarly, an individual's shift duration or frequency may be affected by labor laws and regulations, for example if the need to pay overtime decreased the relative value of an individual performing a task.

While this invention has been described in terms of several embodiments, there are alterations, modifications, permutations, and substitute equivalents, which fall within the scope of this invention. Although subsection titles have been provided to aid in the description of the invention, these titles are merely illustrative and are not intended to limit the scope of the present invention. In addition, where claim limitations have been identified, for example, by a numeral or letter, they are not intended to imply any specific sequence. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

This has been a description of the disclosed invention along with a preferred method of practicing the invention, however the scope of the invention ought to be determined by the appended claims.

What is claimed is:

1. A computer-implemented method to build a schedule, the method comprising:
    establishing a scheduling period and a plurality of tasks to be completed during the scheduling period, wherein each of the plurality of tasks has a duration and one or more required resource(s), and wherein the schedule occurs within an environment;
    assigning a maximum value to each of the plurality of tasks;
    defining one or more factors for each of the plurality of tasks, wherein each of the one or more factors is a function of the environment and an implementation of the schedule, and wherein each of the plurality of tasks has a task expected value that is a product of the maximum value and the one or more factors; and
    implementing the schedule iteratively to maximize a schedule expected value, comprising:
        scheduling a subset of the plurality of tasks and the one or more required resource(s) during the scheduling period;
        calculating the schedule expected value as a sum of the task expected values for the subset of tasks;
        receiving information from the environment;
        updating, using the information, the one or more factors for each of the plurality of tasks;
        updating the task expected value for each of the plurality of tasks using the updated factors; and
        adjusting the schedule to increase the schedule expected value using the updated task expected values.

2. The computer-implemented method to build a schedule of claim 1, wherein the information includes an input from a subordinate decision-making loop.

3. The computer-implemented method to build a schedule of claim 1, further comprising:
    assigning a maximum resource value to each of the one or more required resource(s);
    defining one or more resource factors for each of the one or more required resources, wherein each of the one or more resource factors is a function of the environment and the implementation, and wherein each of the one or more required resources has a resource expected value that is a product of the maximum resource value and the one or more resource factors; and
    implementing the schedule iteratively to maximize the schedule expected value, comprising:
        scheduling a subset of the plurality of tasks and the one or more required resource(s) during the scheduling period;
        calculating the schedule expected value using the task expected values for the subset of tasks and the resource expected values for the one or more required resources;
        receiving information from the environment;
        updating, using the information, the one or more factors for each of the plurality of tasks and the one or more resource factors for the one or more required resources;
        updating the task expected value for each of the plurality of tasks using the updated factors;
        updating the resource expected value for the one or more required resources using the updated resource factors; and
        adjusting the schedule to increase the schedule expected value using the updated task expected values and the updated resource expected values.

4. The computer-implemented method to build a schedule of claim 3, wherein the maximum resource value includes: an availability metric of the required resource; an allocation metric of the required resource; or a duration metric of the required resource.

5. The computer-implemented method to build a schedule of claim 1, wherein the one or more factors is one of the following: a duration of the task; an earlier event; a future event; an allocation of a required resource; how well the task conformed to an ideal; a consistency metric; or a regulatory metric.

6. The computer-implemented method to build a schedule of claim 3, wherein the one or more resource factors is one of the following: an earlier event; a future event; a completion of a task; a consistency metric; or a regulatory metric.

7. The computer-implemented method to build a schedule of claim 1, wherein the assigning step includes using a machine learning model and historical data to adjust the maximum value for each of the plurality of tasks, and wherein the implementing step includes using a machine learning model and historical data to adjust the one or more factors for each of the plurality of tasks.

8. A computer-implemented method to optimize a schedule, the method comprising:
    using an iterative decision-making loop to improve a schedule allocation, wherein the schedule has a maximum value and the schedule allocation has an expected value, comprising:
        receiving information from an environment in which the schedule occurs;
        interpreting the information, comprising;
            determining an updated expected value for the schedule allocation;
            building a second schedule allocation having a second expected value;
            comparing the second expected value to the updated expected value to determine a selected schedule allocation having a selected expected value;
            comparing the selected expected value to the maximum value;
        selecting a course of action from the following: returning to the receiving step; or
    executing the schedule according to the selected schedule allocation; and
    executing the course of action.

9. The computer-implemented method to optimize a schedule of claim 8, wherein the information includes an input from a subordinate decision-making loop.

10. The computer-implemented method to optimize a schedule of claim 8, wherein the information includes one or more factor(s) that is a mathematical function of an environment of the schedule and the schedule allocation, and wherein the one or more factors affects the expected value.

11. The computer-implemented method to optimize a schedule of claim 10, wherein the one or more factor(s) is one of the following: a duration of a task; an earlier event; a future event; an availability of a resource; how well the task conformed to an ideal; a consistency metric; or a regulatory metric.

12. The computer-implemented method to optimize a schedule of claim 8, wherein the selecting step includes using a machine learning model to determine the course of action based on historical data.

13. The computer-implemented method to optimize a schedule of claim 9, further comprising:
assigning a maximum task value to a task to be accomplished in the schedule; and
developing a task expected value, comprising:
receiving information from the environment;
calculating the task expected value using the information; and
providing the task expected value as the input from the subordinate loop.

14. The computer-implemented method to optimize a schedule of claim 9, further comprising:
assigning a maximum resource value to a resource required to accomplish a task; and
developing a resource expected value, comprising:
receiving data from the environment;
calculating the resource expected value using the data; and
providing the resource expected value as the input from the subordinate loop.

15. A computer-implemented method, the method comprising:
assigning a maximum value to a task to be accomplished in a schedule; and
developing an expected value for the task, comprising:
receiving information from an environment in which the schedule occurs;
organizing the information according to relevance to a factor affecting a task value;
calculating a weight of the factor based on the information;
calculating the expected value by modifying the maximum value using the weight of the factor; and
providing the expected value to a process for implementing the schedule.

16. The computer-implemented method of claim 15, further comprising:
assigning a resource maximum value to a resource required for the task; and
developing a resource expected value, comprising:
receiving information from the environment;
organizing the information according to relevance to one or more factors affecting a resource value;
calculating a weight of the one or more factors based on the information; and
calculating the resource expected value by modifying the resource maximum value using the weight of the one or more factors; and
providing the resource expected value to the process.

17. The computer-implemented method of claim 15, wherein the maximum value is derived from one of the following: an importance metric of the task; a priority metric of the task; a duration metric of the task; or a monetary metric of the task.

18. The computer-implemented method of claim 16, wherein the resource maximum value is one of the following: an availability metric of the resource; an allocation metric of the resource; or a duration metric of the resource.

19. The computer-implemented method of claim 15, wherein the factor includes one of the following: a duration of the task; an earlier event; a future event; an allocation of a resource; how well the task conformed to an ideal; a consistency metric; or a regulatory metric.

20. The computer-implemented method of claim 15, wherein the weight is between 0 and 1, and wherein 1 represents conformance to an ideal, and the method further comprising calculating the expected value by taking the product of the weight and the maximum value.

21. The computer-implemented method of claim 15, wherein the weight is represented by a function with outputs ranging from 0 to 1.

22. The computer-implemented method of claim 15, wherein the assigning step includes using a machine learning model and historical data to assign a maximum value to the task, and wherein the developing step includes using a machine learning model and historical data to calculate the weight.

* * * * *